W. CARLISLE.
Feeding-Devices for Carding-Machines
No. 151,840. Patented June 9, 1874.
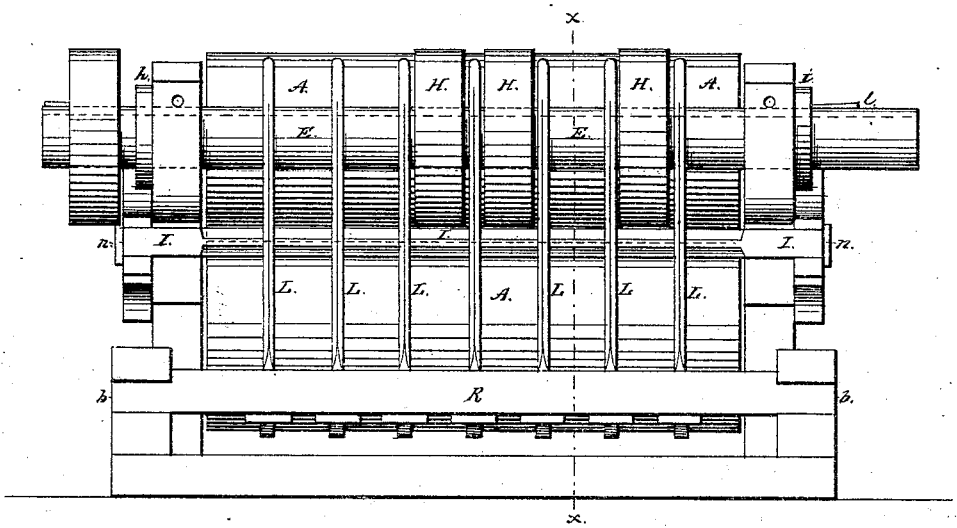
Fig. 1.
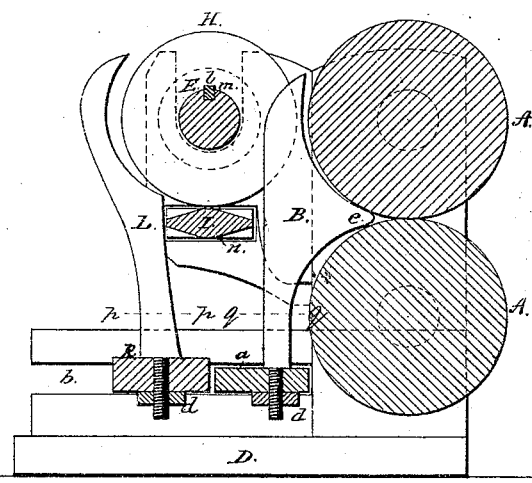
Fig. 2.
Fig. 3. Fig. 4.
Attest:
F. W. Howard
John V. Ewig
Inventor:
William Carlisle
By his Attorneys
Cox and Cox

UNITED STATES PATENT OFFICE

WILLIAM CARLISLE, OF CLEARFIELD COUNTY, PENNSYLVANIA.

IMPROVEMENT IN FEEDING DEVICES FOR CARDING-MACHINES.

Specification forming part of Letters Patent No. 151,840, dated June 9, 1874; application filed January 26, 1874.

*To all whom it may concern:*

Be it known that I, WILLIAM CARLISLE, of Clearfield county, State of Pennsylvania, have invented certain new and useful Improvements in Carding-Machines, of which the following is a description, reference being had to the accompanying drawings.

The invention relates to an improvement in wool-carding machines; and consists in two series of adjustable teeth placed in juxtaposition to a pair of feed-rollers, between which teeth operates a shaft provided with adjustable wheels, which come in contact with the upper surface of a bar placed below the shaft.

Figure 1 is a front elevation of a device embodying the elements of the invention. Fig. 2 is a section through same on the line $x\,x$. Fig. 3 is a section of the tooth L, at a point indicated by the dotted line $p\,p$. Fig. 4 is a like view of the tooth B, on the dotted line $q\,q$.

A in the accompanying drawings are feed-rollers, of usual construction, placed in front of the card. (Not shown.) The teeth B are secured in the bar $a$, movable in the slot $b$ of the frame D, and are provided on their lower ends with a thread and nut, $d$, by which means their edges can be set at any desired angle. The teeth B are edged on their upper portions, and placed so that their shoulders $e$ project toward and in proper proximity to the line where the rollers A impinge, while the other side of the teeth is in close relation to the wheel-shaft E, which revolves in bearings in the side of the frame, being retained in position by the washer $h$ and movable disk $i$, the latter being held in place by a wedge, $l$, passing into the groove $m$, which extends the whole length of the shaft. The wheels H are adjustable upon the shaft E, and may be secured in position by a pin or wedge placed in the groove $m$ below them. The circumference of the wheels H impinges upon the bar I below the shaft E, and also approaches very near the circumference of the upper roller A, the bulk of the wheel in its revolution passing between the upper parts of the teeth B, and when in operation the wheel is exactly opposite a ring of card-teeth upon the doffer. The bar I is sustained at each end below the shaft E in the slot $n$ in the frame, and is placed directly opposite the line where the rollers A impinge. The teeth L are constructed as shown, with their upper portions concave on the sides toward the wheels H, and convex on the other side, and are placed directly opposite the teeth B and have their lower ends secured to the bar R, in a manner similar to that in which the teeth B are secured to the bar $a$, the bar R being also movable in the slot $b$.

In the operation of wool-cards which employ an upper and lower ring-doffer, it is found that with some kinds of wool the upper doffer takes off too fast, while with others it takes off too slowly, thus effecting a variation in the size of the slivers removed from the machine. The object of my invention is to remedy this defect, and it is accomplished by the above-described devices in several ways.

The wheels H may be located on the shaft E so that each occupies a position between alternate pairs of the teeth L and B, and the slivers fed in between each pair of teeth, and the shaft being turned alternate slivers will be fed in freely, and the others will be held back by the pressure of the wheels H against the bar I; or, if the wheels H occupy the spaces between each and every pair of teeth, then alternate slivers may be passed between the wheels and the bar I, and the others below the bar I, the effect being the same as in the first arrangement. In both cases the material fed in, and which is pinched between the wheels and the bar, will be more attenuated than that which is not acted upon by the wheels, and thus, when all is removed by the doffer, the product will be slivers of equal weight. This may also be accomplished in another way, namely, by loosening the nuts $d$ $d$, and turning the teeth L and B so as to make alternate spaces between them wider than the others, and thus present the slivers to the feed-rolls A A and main cylinders (not shown) in alternate heaped and flattened form.

The wheels H may be readily moved on their shaft to a position opposite a ring of clothing on either the upper or lower doffer, by withdrawing the wedge moving the wheel to the desired place, and there securing it by reinserting the wedge.

What I claim as my invention, and desire to secure by Letters Patent, is—

1. The adjustable teeth L and B, provided with the bars d, substantially as shown, and for the purpose described.

2. The shaft E, provided with the wheels H, in combination with the bar I, substantially as and for the purposes described.

3. The shaft E, provided with the wheels H, in combination with the teeth L and bar I, substantially as shown and set forth.

In testimony that I claim the foregoing improvements in carding-machines, as above described, I have hereunto set my hand and seal this 9th day of January, 1874.

WILLIAM CARLISLE. [L. S.]

Witnesses:
DANIEL HARTSOOK,
JAMES G. HILL.